US006999932B1

(12) United States Patent
Zhou

(10) Patent No.: US 6,999,932 B1
(45) Date of Patent: Feb. 14, 2006

(54) LANGUAGE INDEPENDENT VOICE-BASED SEARCH SYSTEM

(75) Inventor: Guojun Zhou, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 140 days.

(21) Appl. No.: 09/685,419

(22) Filed: Oct. 10, 2000

(51) Int. Cl.
*G10L 13/08* (2006.01)
*G06F 17/27* (2006.01)

(52) U.S. Cl. ...................... 704/277; 704/260; 704/235; 704/7

(58) Field of Classification Search ............ 704/270.1, 704/275, 270, 277, 251, 260, 266
See application file for complete search history.

(56) References Cited

U.S. PATENT DOCUMENTS 3,704,345 A * 11/1972 Coker et al. ................ 704/266
5,740,349 A 4/1998 Hasbun et al.
6,324,512 B1 * 11/2001 Junqua et al. .............. 704/231

FOREIGN PATENT DOCUMENTS

| | | | |
|---|---|---|---|
| EP | 0 838 765 A1 | | 4/1998 |
| EP | 1 014 277 A1 | | 6/2000 |
| EP | 1 033 701 A2 | | 9/2000 |
| WO | WO01/16936 A1 | | 3/2001 |

OTHER PUBLICATIONS

J. N. Holmes; Speech Synthesis and Recognition; 1988, Chapman & Hall, pp. 6 and 7.*
F. Pellegrino; R. Andre-Obrecht, An Unsupervised Approach To Language Identification, IRIT, 1999, pp. 833-836, Toulouse Cedex, France.
Wayne Ward, Extracting Information In Spontaneous Speech, ICSLP 94, Yokohama, pp. 83-86, Pittsburgh, Pennsylvania.
Eric Nyberg; Teruko Mitamura: Jaime Carbonell, The KANT Machine Translation System: From R&D to Initial Deployment, Paper presented at the LISA Workshop, Jun. 1997, pp. 1-7, Pittsburgh, PA.
James Glass; Joseph Polifroni; Stephanie Seneff, Multilingual Language Generation Across Multiple Domains, Paper presented at the International Conference on Spoken Language Processing, Sep. 1994, pp. 1-3, Cambridge, MA.
James L. Hieronymus; Shubha Kadambe, Robust Spoken Language Identification Using Large Vocabulary Speech Recognition, Bell Laboratories, 1997, pp. 1111-1114, MD.
Stephanie Seneff, Tina: A Natural Language System For Spoken Language Applications, Association for Computational Linguistics. 1992, pp. 61-86. vol. 18, No. 1, MA.
T. Kristjansson; T.S. Huang, P. Ramesh; B.H. Juang, A Unified Structure-Based Framework for Indexing and Gisting of Meetings, 1999, pp. 572-577.

* cited by examiner

*Primary Examiner*—Abul K. Azad
(74) *Attorney, Agent, or Firm*—Blakely, Sokoloff, Taylor & Zafman LLP

(57) ABSTRACT

A language independent, voice based user interface method includes receiving voice input data spoken by a user, identifying a language spoken by the user from the voice input data, converting the voice input data into a first text in the identified language by recognizing the user's speech in the voice input data based at least in part on the language identifier, parsing the first text to extract a keyword, and using the keyword as a command to an application. Further actions include receiving results to the command, converting the results into a second text in a natural language format according to the identified language, and rendering the second text for perception by the user.

30 Claims, 3 Drawing Sheets

LANGUAGE INDEPENDENT VOICE-BASED SEARCH SYSTEM

BACKGROUND

1. Field

The present invention relates generally to web browsers and search engines and, more specifically, to user interfaces for web browsers using speech in different languages.

2. Description

Currently, the Internet provides more information for users than any other source. However, it is often difficult to find the information one is looking for. In response, search engines have been developed to help locate desired information. To use a search engine, a user typically types in a search term using a keyboard or selects a search category using a mouse. The search engine then searches the Internet or an intranet based on the search term to find relevant information. This user interface constraint significantly limits the population of possible users who would use a web browser to locate information on the Internet or an intranet, because users who have difficulty typing in the search term in the English language (for example, people who only speak Chinese or Japanese) are not likely to use such search engines.

When a search engine or web portal supports the display of results in multiple languages, the search engine or portal typically displays web pages previously prepared in a particular language only after the user selects, using a mouse, the desired language for output purposes.

Recently, some Internet portals have implemented voice input services whereby a user can ask for information about certain topics such as weather, sports, stock scores, etc., using a speech recognition application and a microphone coupled to the user's computer system. In these cases, the voice data is translated into a predetermined command the portal recognizes in order to select which web page is to be displayed. However, the English language is typically the only language supported and the speech is not conversational. No known search engines directly support voice search queries.

BRIEF DESCRIPTION OF THE DRAWINGS

The features and advantages of the present invention will become apparent from the following detailed description of the present invention in which.

DETAILED DESCRIPTION

Figure 1:
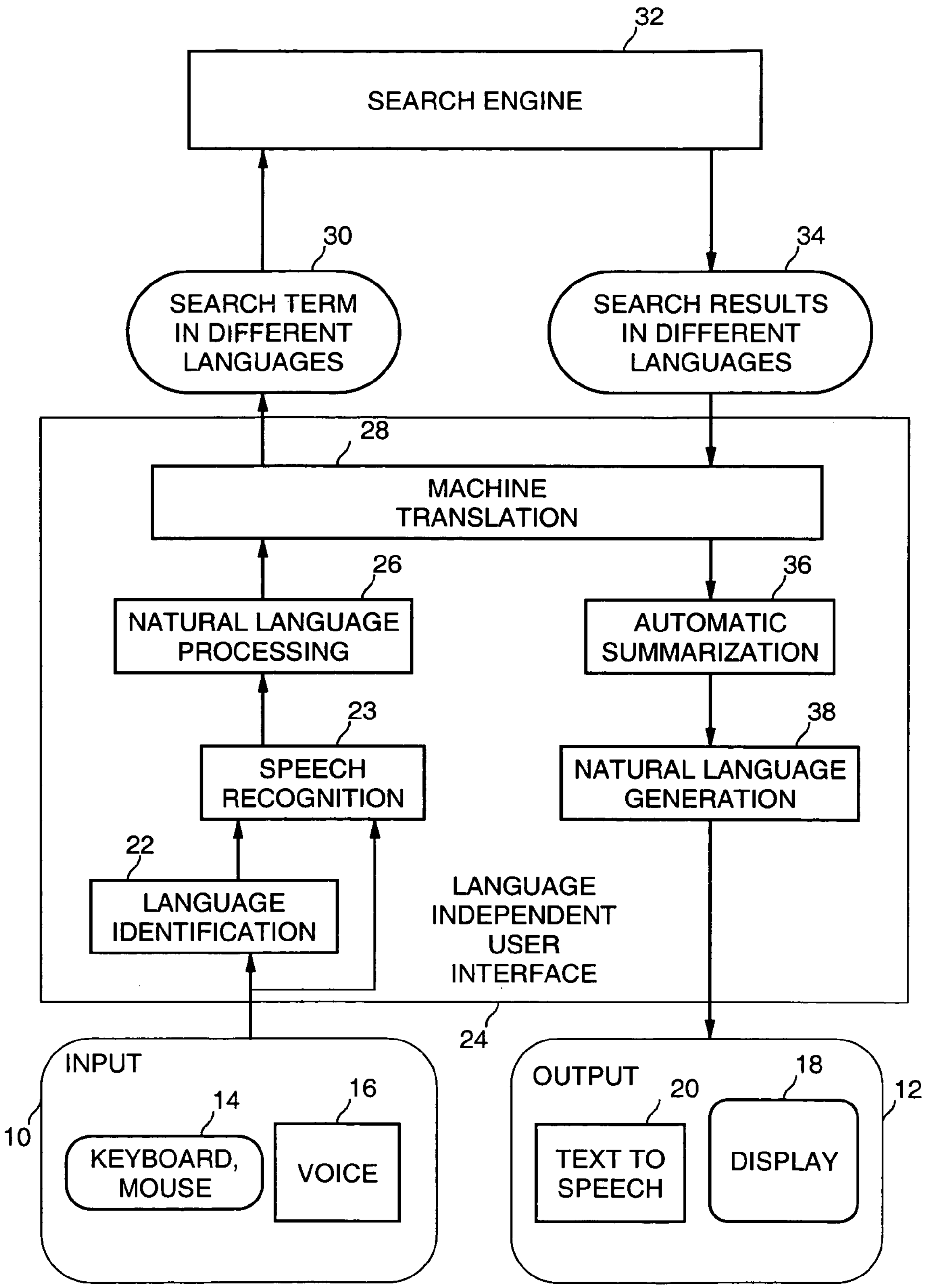
FIG. 1 is a diagram of a language independent voice-based search system according to an embodiment of the present invention.

An embodiment of the present invention is a method and apparatus for a language independent, voice-based Internet or intranet search system. The present invention may be used to enrich the current Internet or intranet search framework by allowing users to search for desired information via their own native spoken languages. In one embodiment, the search system may accept voice input data from a user spoken in a conversational manner, automatically identify the language spoken by the user, recognize the speech in the voice input data, and conduct the desired search using the speech as input data for a search query to a search engine. To make the language independent voice-based search system even more powerful, several features may also be included in the system. Natural language processing (NLP) may be applied to extract the search terms from the naturally spoken query so that users do not have to speak the search terms exactly (thus supporting conversational speech). Machine translation may be utilized to translate search terms as well as search results across multiple languages so that the search space may be substantially expanded. Automatic summarization techniques may be used to summarize the search results if the results are not well organized or are not presented in a user-preferred way. Natural language generation and text to speech (TTS) techniques may be employed to present the search results back to the user orally in the user's native spoken language. The universal voice search concept of the present invention, once integrated with an Internet or intranet search engine, becomes a powerful tool for people speaking different languages to make use of information available on the Internet or an intranet in the most convenient way. This system may promote increased Internet usage among non-English speaking people by making search engines or other web sites easier to use.

Reference in the specification to "one embodiment" or "an embodiment" of the present invention means that a particular feature, structure or characteristic described in connection with the embodiment is included in at least one embodiment of the present invention. Thus, the appearances of the phrase "in one embodiment" appearing in various places throughout the specification are not necessarily all referring to the same embodiment.

Embodiments of the present invention provide at least several features. Speech recognition allows users to interact with Internet search engines in the most natural and effective medium, that of the user's own voice. This may be especially useful in various Asian countries where users may not be able to type their native languages quickly because of the nature of these written languages. Automatic language identification allows users speaking different languages to search the Internet or an intranet using a single system via their own voice without specifically telling the system what language they are speaking. This feature may encourage significant growth in the Internet user population for search engines, and the World Wide Web (WWW) in general. Natural language processing may be employed to allow users to speak their own search terms in a search query in a natural, conversational way. For example, if the user says "could you please search for articles about the American Civil War for me?", the natural language processing function may convert the entire sentence into the search term "American Civil War", rather than requiring the user to only say "American Civil War" exactly.

Further, machine translation of languages may be used to enable a search engine to conduct cross language searches. For example, if a user speaks the search term in Chinese, machine translation may translate the search term into other languages (e.g., English, Spanish, French, German, etc.) and conduct a much wider search over the Internet. If anything is found that is relevant to the search query but the web pages are written in languages other than Chinese, the present invention translates the search results back into Chinese (the language of the original voice search query). An automatic summarization technique may be used to assist in summarizing the search results if the results are scattered in a long document, for example, or otherwise hard to identify in the information determined relevant to the search term by the search engine. If the search results are presented in a format that is not preferred by the user, the present invention may summarize the results and present them to the user in a different way. For example, if the results are presented in a color figure and the user has difficulty distinguishing certain colors, the present invention may summarize the figure's contents and present the information to the user in a textual form.

Natural language generation helps to organize the search results and generate a response that suits the naturally spoken language that is the desired output language. That is, the results may be modified in a language-specific manner. Text to speech (TTS) functionality may be used to render the search results in an audible manner if the user selects that mode of output. For example, the user's eyes may be busy or the user may prefer an oral response to the spoken search query.

The architecture of the language independent voice-based search system is shown in FIG. 1. A user (not shown) interacts with input 10 and output 12 capabilities. For input capabilities, the system supports at least traditional keyboard and mouse 14 functionality, as well as voice 16 input functionality. Voice input may be supported in the well-known manner by accepting speech or other audible sounds from a microphone coupled to the system. The received audio data may be digitized and converted into a format that a speech recognition module or a language identification module accepts. For output capabilities, the system may render the search results as text or images on a display 18 in the traditional manner. Alternatively, the system may render the search results audibly using a well-known text to speech function 20. Processing of each of the identified input and output capabilities are known to those skilled in the art and won't be described further herein. In other embodiments, other input and/or output processing may also be used without limiting the scope of the present invention.

When a user decides to use his or her voice to conduct a search, the user speaks into the microphone coupled to the system and asks the system to find what the user is interested in. For example, the user might speak "hhhmm, find me information about who won, uh, won the NFL Super Bowl in 2000." Furthermore, the user may speak this in any language supported by the system. For example, the system may be implemented to support Chinese, Japanese, English, French, Spanish, and Russian as input languages. In various embodiments, different sets of languages may be supported.

Once the voice input data is captured and digitized, the voice input data may be forwarded to language identification module 22 within language independent user interface 24 to determine what language the user is speaking. Language identification module 22 extracts features from the voice input data to distinguish which language is being spoken and outputs an identifier of the language used. Various algorithms for automatically identifying languages from voice data are known in the art. Generally, a Hidden Markov model or neural networks may be used in the identification algorithm. In one embodiment of the present invention, a spoken language identification system may be used such as is disclosed in "Robust Spoken Language Identification Using Large Vocabulary Speech Recognition", by J. L. Hieronymus and S. Kadambe, 1997 IEEE International Conference on Acoustics, Speech, and Signal Processing. In another embodiment, a spoken language identification system may be used such as is disclosed in "An Unsupervised Approach to Language Identification", by F. Pellegrino and R. Andre-Obrecht, 1999 IEEE International Conference on Acoustics, Speech and Signal Processing. In other embodiments, other automatic language identification systems now known or yet to be developed may be employed. Regardless of the language identification system used, developers of the system may train the models within the language identification system to recognize a selected set of languages to be supported by the search system.

Based, at least in part, on the language detected, the voice input data may be passed to speech recognition module 23 in order to be converted into a text format. Portions of this processing may, in some embodiments, be performed in parallel with language identification module 22. Speech recognition module 23 accepts the voice data to be converted and the language identifier, recognizes what words have been said, and translates the information into text.

Thus, speech recognition module 23 provides a well-known speech to text capability. Any one of various commercially available speech to text software applications may be used in the present system for this purpose. For example, ViaVoice™, commercially available from International Business Machines (IBM) Corporation, allows users to dictate directly into various application programs. Different versions of ViaVoice™ support multiple languages (such as English, Chinese, French and Italian).

In many cases, the text determined by the speech recognition module may be grammatically incorrect. Since the voice input may be spontaneous speech by the user, the resulting text may contain filler words, speech idioms, repetition, and so on. Natural language processing module 26 may be used to extract keywords from the text. Natural language processing module contains a parser to parse the text output by the speech recognition module to identify the key words and discard the unimportant words within the text. In the example above, the words and sounds "hhmm find me information about who won uh won the in" may be discarded and the words "NFL Super Bowl 2000" may be identified as keywords. Various algorithms and systems for implementing parsers to extract selected speech terms from spoken language are known in the art. In one embodiment of the present invention, a parser as disclosed in "Extracting Information in Spontaneous Speech" by Wayne Ward, 1994 Proceedings of the International Conference on Spoken Language Processing (ICSLP) may be used. In another embodiment, a parser as disclosed in "TINA: A Natural Language System for Spoken Language Applications", by S. Seneff, Computational Linguistics, March, 1992, may be used. In other embodiments, other natural language processing systems now known or yet to be developed may be employed.

Once the keywords have been extracted from the text, the keywords may be translated by machine translation module 28 into a plurality of supported languages. By translating the keywords into multiple languages and using the keywords as search terms, the search can be performed across documents in different languages, thereby significantly extending the search space used. Various algorithms and systems for implementing machine translation of languages are known in the art. In one embodiment of the present invention, machine translation as disclosed in "The KANT Machine Translation System: From R&D to Initial Deployment", by E. Nyberg, T. Mitamura, and J. Carbonell, Presentation at 1997 LISA Workshop on Integrating Advanced Translation Technology, may be used. In other embodiments, other machine translation systems now known or yet to be developed may be employed.

The keywords may be automatically input as search terms in different languages 30 to a search engine 32. Any one or more of various known search engines may be used (e.g., Yahoo, Excite, AltaVista, Google, Northern Lights, and the like). The search engine searches the Internet or a specified intranet and returns the search results in different languages 34 to the language independent user interface 24. Depending on the search results, the results may be in a single language or multiple languages. If the search results are in multiple languages, machine translation module 28 may be used to translate the search results into the language used by the user. If the search results are in a single language that is not the user's language, the results may be translated into the user's language.

Automatic summarization module 36 may be used to summarize the search results, if necessary. In one embodiment of the present invention, the teachings of T. Kristjansson, T. Huang, P. Ramesh, and B. Juang in "A Unified Structure-Based Framework for Indexing and Gisting of Meetings", 1999 IEEE International Conference on Multimedia Computing and Systems, may be used to implement automatic summarization. In other embodiments, other techniques for summarizing information now known or yet to be developed may be employed.

Natural language generation module 36 may be used to take the summarized search results in the user's language and generate naturally spoken forms of the results. The results may be modified to conform to readable sentences using a selected prosodic pattern so the results sound natural and grammatically correct when rendered to the user. In one embodiment of the present invention, a natural language generation system may be used as disclosed in "Multilingual Language Generation Across Multiple Domains", by J. Glass, J. Polifroni, and S. Seneff, 1994 Proceeding of International Conference on Spoken Language Processing (ICSLP), although other natural language generation processing techniques now known or yet to be developed may also be employed.

The output of the natural language generation module may be passed to text to speech module 20 to convert the text into an audio format and render the audio data to the user. Alternatively, the text may be shown on a display 18 in the conventional manner. Various text to speech implementations are known in the art. In one embodiment, ViaVoice™ Text-To-Speech (TTS) technology available from IBM Corporation may be used. Other implementations such as multilingual text-to-speech systems available from Lucent Technologies Bell Laboratories may also be used. In another embodiment, while the search results are audibly rendered for the user, visual TTS may also be used to display a facial image (e.g., a talking head) animated in synchronization with the synthesized speech. Realistic mouth motions on the talking head matching the speech sounds not only give the perception that the image is talking, but can increase the intelligibility of the rendered speech. Animated agents such as the talking head may increase the user's willingness to wait while searches are in progress.

Although the above discussion focused on search engines as an application for language independent voice-based input, other known applications supporting automatic language identification of spoken input may also benefit from the present invention. Web browsers including the present invention may be used to interface with web sites or applications other than search engines. For example, a web portal may include the present invention to support voice input in different languages. An e-commerce web site may accept voice-based orders in different languages and return confirmation information orally in the language used by the buyer. For example, the keyword sent to the web site by the language independent user interface may be a purchase order or a request for product information originally spoken in any language supported by the system. A news web site may accept oral requests for specific news items from users speaking different languages and return the requested news items in the language spoken by the users. Many other applications and web sites may take advantage of the capabilities provided by the present invention.

In other embodiments, some of the modules in the language independent user interface may be omitted if desired. For example, automatic summarization may be omitted, or if only one language is to be supported, machine translation may be omitted.

Figure 2:
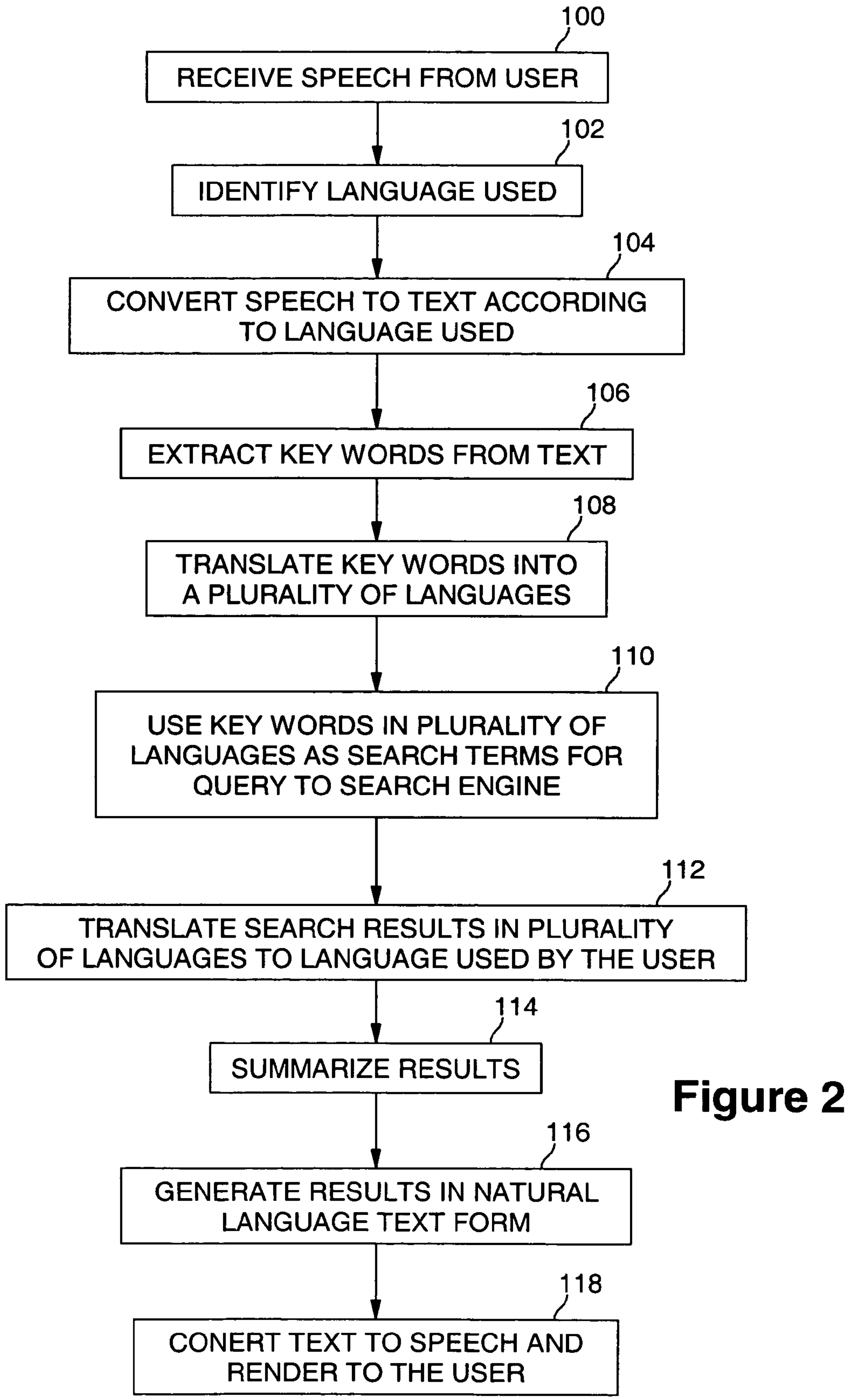
FIG. 2 is a flow diagram illustrating language independent voice-based searching according to an embodiment of the present invention.

FIG. 2 is a flow diagram illustrating language independent voice-based searching according to an embodiment of the present invention. At block 100, speech may be received from a user and converted into a digital representation. At block 102, the digitized speech may be analyzed to identify the language used by the user. At block 104, the speech may be converted into text according to the identified language. At block 106, keywords may be extracted from the text by parsing the text. At block 108, the keywords may be translated into a plurality of languages. At block 110, the keywords in a plurality of languages may be used as search terms for queries to one or more search engines. At block 112, the search results in a plurality of languages from the one or more search engines may be translated into the language used by the user. Next, at block 114, the search results may be summarized (if necessary). At block 116, the search results may be generated in a text form that represents natural language constructs for the user's language. At block 118, the text may be converted to speech using a text to speech module and rendered in an audible manner for the user.

In the preceding description, various aspects of the present invention have been described. For purposes of explanation, specific numbers, systems and configurations were set forth in order to provide a thorough understanding of the present invention. However, it is apparent to one skilled in the art having the benefit of this disclosure that the present invention may be practiced without the specific details. In other instances, well-known features were omitted or simplified in order not to obscure the present invention.

Embodiments of the present invention may be implemented in hardware or software, or a combination of both. However, embodiments of the invention may be implemented as computer programs executing on programmable systems comprising at least one processor, a data storage system (including volatile and non-volatile memory and/or storage elements), at least one input device, and at least one output device. Program code may be applied to input data to perform the functions described herein and generate output information. The output information may be applied to one or more output devices, in known fashion. For purposes of this application, a processing system embodying the playback device components includes any system that has a processor, such as, for example, a digital signal processor (DSP), a microcontroller, an application specific integrated circuit (ASIC), or a microprocessor.

The programs may be implemented in a high level procedural or object oriented programming language to communicate with a processing system. The programs may also be implemented in assembly or machine language, if desired. In fact, the invention is not limited in scope to any particular programming language. In any case, the language may be a compiled or interpreted language.

The programs may be stored on a storage media or device (e.g., hard disk drive, floppy disk drive, read only memory (ROM), CD-ROM device, flash memory device, digital versatile disk (DVD), or other storage device) readable by a general or special purpose programmable processing system, for configuring and operating the processing system when the storage media or device is read by the processing system to perform the procedures described herein. Embodiments of the invention may also be considered to be implemented as a machine-readable storage medium, configured for use with a processing system, where the storage medium so configured causes the processing system to operate in a specific and predefined manner to perform the functions described herein.

Figure 3:
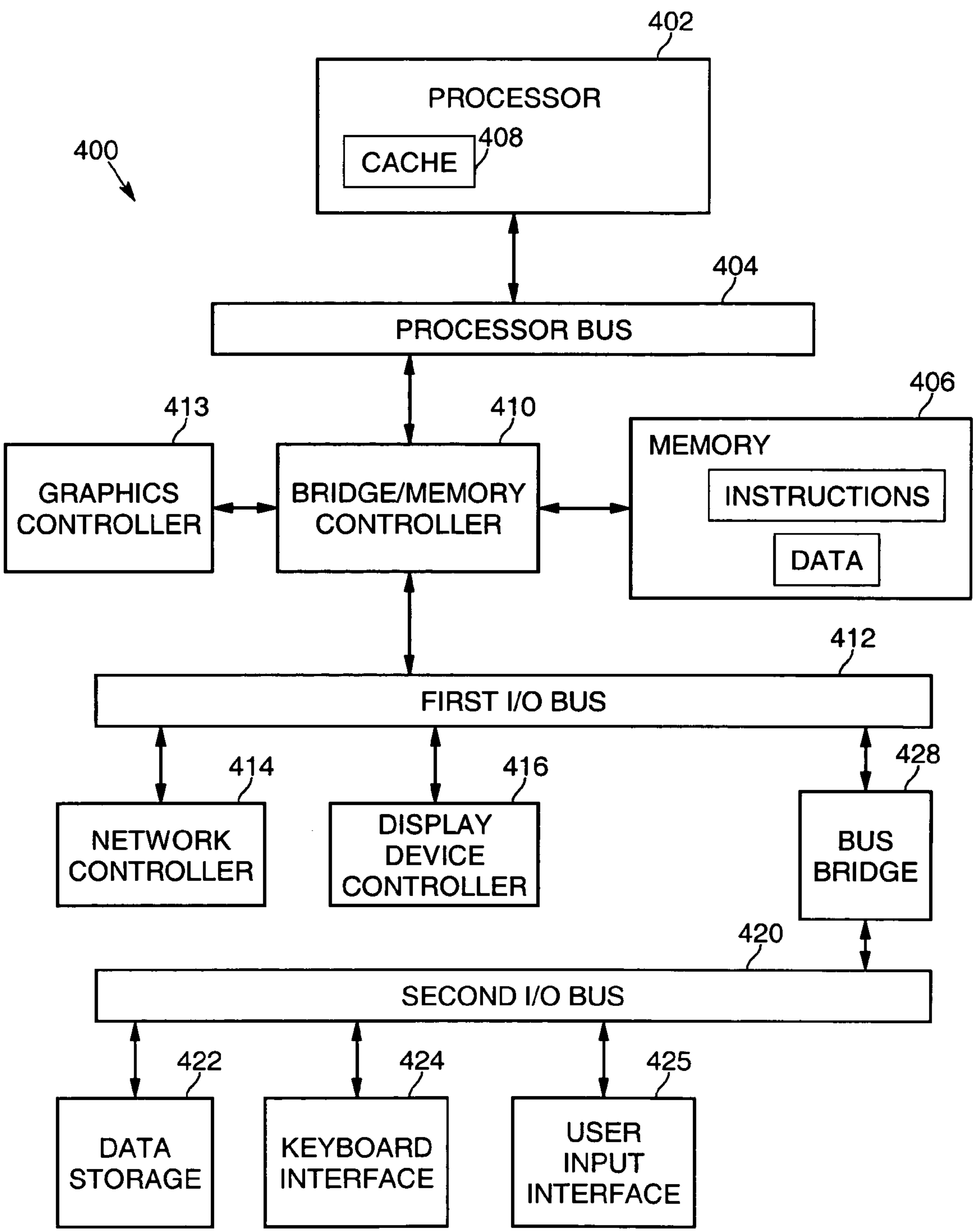
FIG. 3 is a diagram illustrating a sample processing system capable of being operated as a language independent voice-based search system according to an embodiment of the present invention.

An example of one such type of processing system is shown in FIG. 3, however, other systems may also be used and not all components of the system shown are required for the present invention. Sample system 400 may be used, for example, to execute the processing for embodiments of the language independent voice based search system, in accordance with the present invention, such as the embodiment described herein. Sample system 400 is representative of processing systems based on the PENTIUM®II, PENTIUM® III and CELERON™ microprocessors available from Intel Corporation, although other systems (including personal computers (PCs) having other microprocessors, engineering workstations, other set-top boxes, and the like) and architectures may also be used.

FIG. 3 is a block diagram of a system 400 of one embodiment of the present invention. The system 400 includes a processor 402 that processes data signals. Processor 402 may be coupled to a processor bus 404 that transmits data signals between processor 402 and other components in the system 400.

System 400 includes a memory 406. Memory 406 may store instructions and/or data represented by data signals that may be executed by processor 402. The instructions and/or data may comprise code for performing any and/or all of the techniques of the present invention. Memory 406 may also contain additional software and/or data (not shown). A cache memory 408 may reside inside processor 402 that stores data signals stored in memory 406.

A bridge/memory controller 410 may be coupled to the processor bus 404 and memory 406. The bridge/memory controller 410 directs data signals between processor 402, memory 406, and other components in the system 400 and bridges the data signals between processor bus 404, memory 406, and a first input/output (I/O) bus 412. In this embodiment, graphics controller 413 interfaces to a display device (not shown) for displaying images rendered or otherwise processed by the graphics controller 413 to a user.

First I/O bus 412 may comprise a single bus or a combination of multiple buses. First I/O bus 412 provides communication links between components in system 400. A network controller 414 may be coupled to the first I/O bus 412. In some embodiments, a display device controller 416 may be coupled to the first I/O bus 412. The display device controller 416 allows coupling of a display device to system 400 and acts as an interface between a display device (not shown) and the system. The display device receives data signals from processor 402 through display device controller 416 and displays information contained in the data signals to a user of system 400.

A second I/O bus 420 may comprise a single bus or a combination of multiple buses. The second I/O bus 420 provides communication links between components in system 400. A data storage device 422 may be coupled to the second I/O bus 420. A keyboard interface 424 may be coupled to the second I/O bus 420. A user input interface 425 may be coupled to the second I/O bus 420. The user input interface may be coupled to a user input device, such as a remote control, mouse, joystick, or trackball, for example, to provide input data to the computer system. A bus bridge 428 couples first I/O bridge 412 to second I/O bridge 420.

Embodiments of the present invention are related to the use of the system 400 as a language independent voice based search system. According to one embodiment, such processing may be performed by the system 400 in response to processor 402 executing sequences of instructions in memory 404. Such instructions may be read into memory 404 from another computer-readable medium, such as data storage device 422, or from another source via the network controller 414, for example. Execution of the sequences of instructions causes processor 402 to execute language independent user interface processing according to embodiments of the present invention. In an alternative embodiment, hardware circuitry may be used in place of or in combination with software instructions to implement embodiments of the present invention. Thus, the present invention is not limited to any specific combination of hardware circuitry and software.

The elements of system 400 perform their conventional functions in a manner well-known in the art. In particular, data storage device 422 may be used to provide long-term storage for the executable instructions and data structures for embodiments of the language independent voice based search system in accordance with the present invention, whereas memory 406 is used to store on a shorter term basis the executable instructions of embodiments of the language independent voice based search system in accordance with the present invention during execution by processor 402.

While this invention has been described with reference to illustrative embodiments, this description is not intended to be construed in a limiting sense. Various modifications of the illustrative embodiments, as well as other embodiments of the invention, which are apparent to persons skilled in the art to which the inventions pertains are deemed to lie within the spirit and scope of the invention.

What is claimed is:

1. A method of interfacing to a system comprising:

receiving speech input data from a user;

identifying a language spoken by the user from the speech input data;

converting the speech input data into a first text in the identified language by recognizing the user's speech in the speech input data based at least in part on the language identifier;

parsing the first text to extract keywords;

automatically translating the keywords into a plurality of automatically selected languages other than the identified language;

using the translated keywords as a command to an application;

receiving results to the command;

automatically summarizing the results;

converting the summarized results into a second text with a prosodic pattern according to the language spoken by the user; and rendering the second text for perception by the user.

2. The method of claim 1, wherein rendering comprises converting the second text into speech and rendering the speech to the user.

3. The method of claim 1, further comprising using the keywords as a search query to at least one search engine, wherein the results comprise search results from the at least one search engine operating on the search query.

4. The method of claim 1, further comprising automatically translating the keywords into a plurality of automatically selected languages other than the identified language and using the translated keywords as a search query to at least one search engine in multiple languages, wherein the results comprise search results in multiple languages from the at least one search engine operating on the search query.

5. The method of claim 4, further comprising automatically translating search results in languages other than the language spoken by the user into the language spoken by the user.

6. The method of claim 1, wherein the application comprises a web browser.

7. The method of claim 6, wherein the web browser interfaces with at least one search engine and the command comprises a search query.

8. The method of claim 6, wherein the web browser interfaces with a shopping web site and the command comprises at least one of a purchase order and a request for product information.

9. The method of claim 1, wherein the speech comprises conversational speech.

10. The method of claim 1, wherein the prosodic pattern is capable of making the second text sound natural and grammatically correct.

11. An article comprising: a storage medium having a plurality of machine readable instructions, wherein when the instructions are executed by a processor, the instructions provide for interfacing to a system by receiving speech input data from a user, identifying a language spoken by the user from the speech input data, converting the speech input data into a first text in the identified language by recognizing the user's speech in the speech input data based at least in part on the language identifier, parsing the first text to extract keywords, automatically translating the keywords into a plurality of automatically selected languages other than the identified language, using the translated keywords as a command to an application, receiving results to the command, automatically summarizing the results, converting the summarized results into a second text a prosodic pattern according to the language spoken by the user, and rendering the second text for perception by the user.

12. The article of claim 11, wherein instructions for rendering comprise instructions for converting the second text into speech and rendering the speech to the user.

13. The article of claim 11, further comprising instructions for using the keywords as a search query to at least one search engine, wherein the results comprise search results from the at least one search engine operating on the search query.

14. The article of claim 11, further comprising instructions for automatically translating the keywords into a plurality of automatically selected languages other than the identified language and using the translated keywords as a search query to at least one search engine in multiple languages, wherein the results comprise search results in multiple languages from the at least one search engine operating on the search query.

15. The article of claim 14, further comprising instructions for automatically translating search results in languages other than the language spoken by the user into the language spoken by the user.

16. The article of claim 11, wherein the application comprises a web browser.

17. The article of claim 16, wherein the web browser interfaces with at least one search engine and the command comprises a search query.

18. The article of claim 16, wherein the web browser interfaces with a shopping web site and the command comprises at least one of a purchase order and a request for product information.

19. The article of claim 11, wherein the speech comprises conversational speech.

20. The article of claim 11, wherein the prosodic pattern makes the second text sound natural and grammatically correct.

21. A language independent speech based user interface system comprising:

- a language identifier to receive speech input data from a user and to identify the language spoken by the user;
- at least one speech recognizer to receive the speech input data and the language identifier and to convert the speech input data into a first text based at least in part on the language identifier;
- at least one natural language processing module to parse the first text to extract keywords;
- at least one summarization module to automatically summarize the search results from at least one search engine operating on the search query using the extracted keywords;
- at least one language translator to automatically translate the keywords into a plurality of automatically selected languages other than the identified language for use as a command to an application, and to translated results to the command in languages other than a language spoken by the user to the language spoken by the user; and
- at least one natural language generator to convert the summarized results into a second text with a prosodic pattern according to the language spoken by the user.

22. The system of claim 21, further comprising at least one text to speech module to render the second text audibly to the user.

23. The system of claim 21, further comprising at least one language translator to automatically translate the keywords into a plurality of automatically selected languages for use as a search query, and to automatically translate the search results in languages other than the language spoken by the user into the language spoken by the user prior to summarizing the translated results and converting the summarized results into the second text in a natural language format.

24. The system of claim 21, wherein the system is coupled to a web browser.

25. The system of claim 24, wherein the web browser interfaces with at least one search engine, the keyword comprises a search query, and the second text comprises search results from the at least one search engine.

26. The system of claim 24, wherein the web browser interfaces with a shopping web site and the command comprises at least one of a purchase order and a request for product information.

27. The system of claim 21, wherein the prosodic pattern makes the second text sound natural and grammatically correct.

28. A language independent speech based search system comprising:

a language identifier to receive speech input data from a user and to identify the language spoken by the user;

at least one speech recognizer to receive the speech input data and the language identifier and to convert the speech input data into a first text based at least in part on the language identifier;

at least one natural language processing module to parse the first text to extract keywords;

at least one search engine to use the keywords as a search term and to return search results;

at least one language translator to automatically translate the keyword into a plurality of automatically selected languages prior to input to the at least one search engine to search across multiple languages, and to automatically translate search results in languages other than the language spoken by the user into the language spoken by the user;

at least one automatic summarization module to automatically summarize the translated search results;

at least one natural language generator to convert the summarized results into a second text with a prosodic pattern according to the language spoken by the user.

29. The system of claim 28, further comprising at least one text to speech module to render the second text audibly to the user.

30. The system of claim 28, wherein the prosodic pattern makes the second text sound natural and grammatically correct.

* * * * *